Nov. 9, 1971  TSUYOSHI KOIDE  3,618,270
LATHE WITH TORQUE RESPONSIVE PRESSURE ADJUSTMENT
Filed June 19, 1970  2 Sheets-Sheet 2
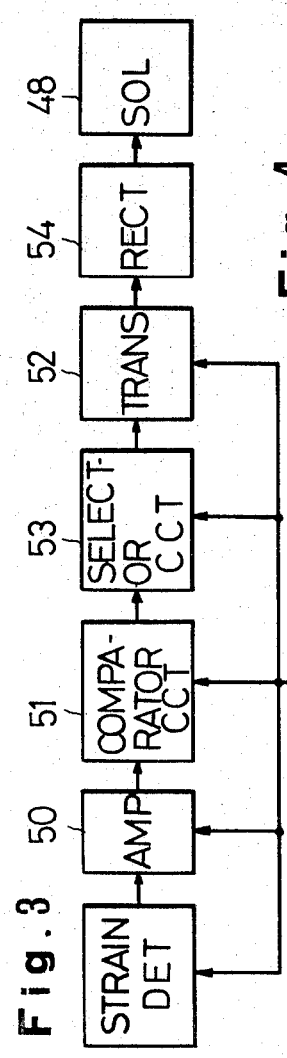
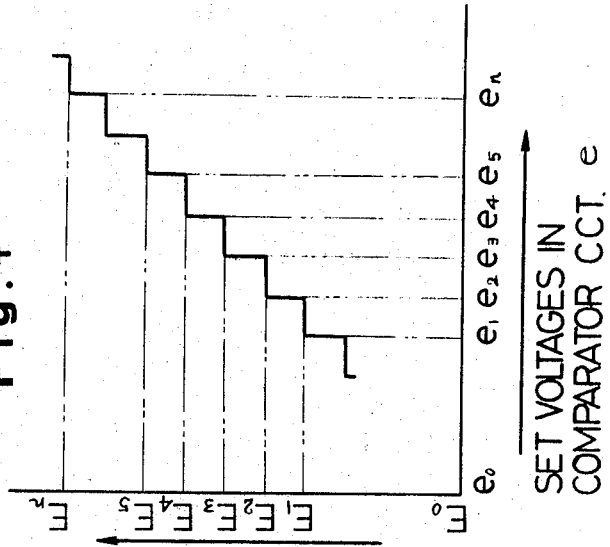
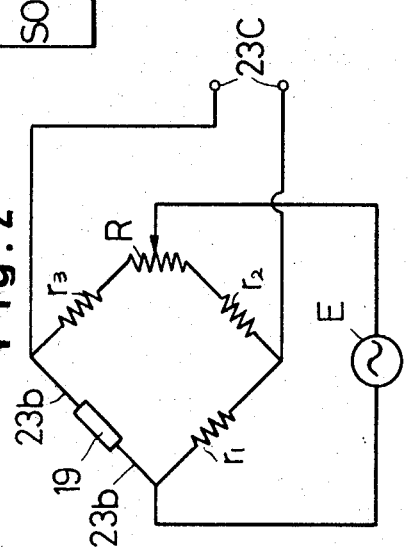
INVENTOR
Tsuyoshi Koide
BY Wenderoth Lind & Ponack
ATTORNEY

United States Patent Office 3,618,270
Patented Nov. 9, 1971

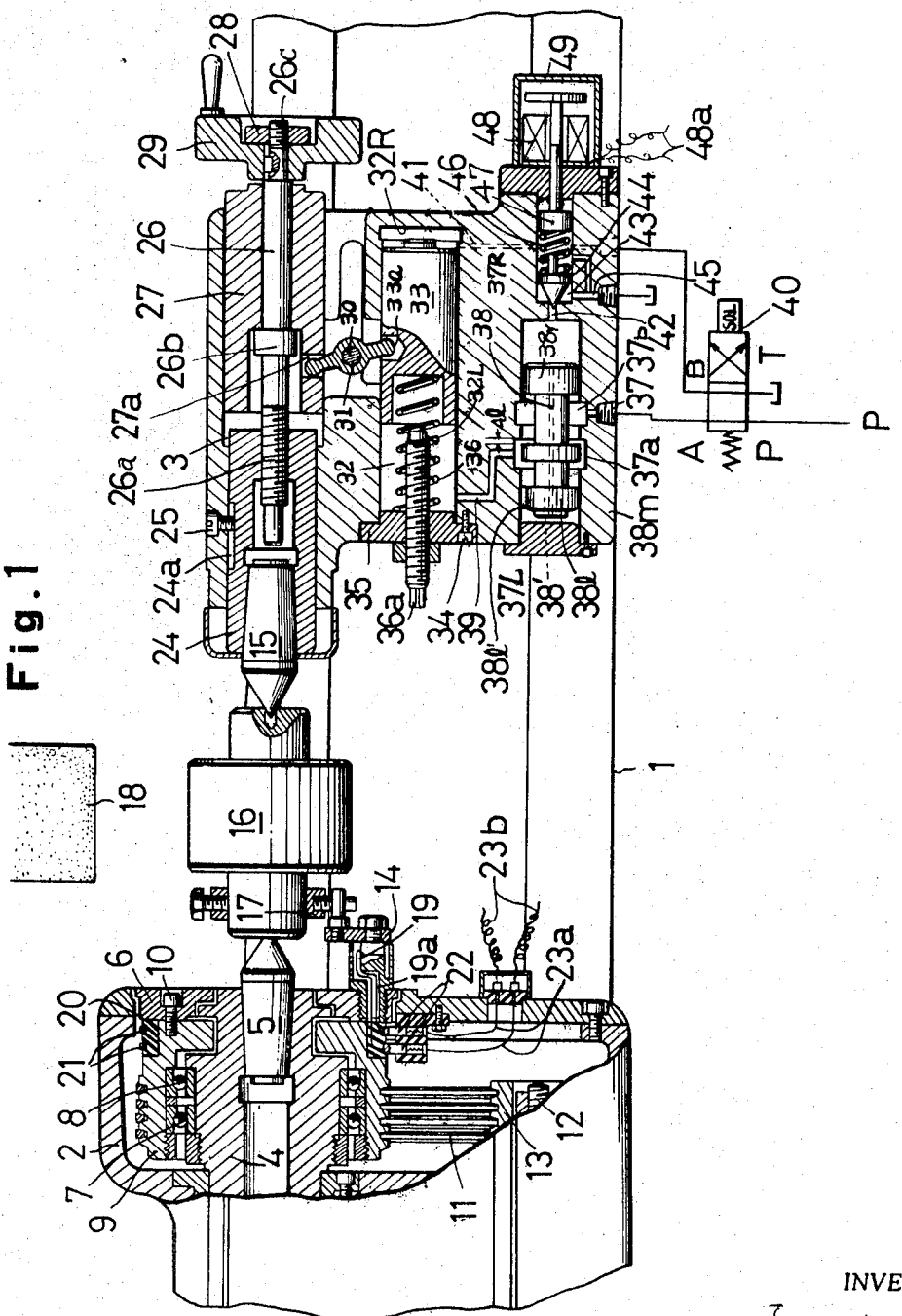

3,618,270
LATHE WITH TORQUE RESPONSIVE
PRESSURE ADJUSTMENT
Tsuyoshi Koide, Kariya-shi, Japan, assignor to Toyoda
Koki Kabushiki Kaisha, Aichi-ken, Japan
Filed June 19, 1970, Ser. No. 47,796
Claims priority, application Japan, July 3, 1969,
44/52,973
Int. Cl. B24b 5/02; B23b 19/02
U.S. Cl. 51—237
8 Claims

ABSTRACT OF THE DISCLOSURE

A device for supporting a workpiece between a head stock center and a tail stock center comprises an electric gauge responsive to the cutting resistance of the workpiece, a control circuit to convert the output of the electric gauge into an electrical output, means to apply fluid pressure to the tail stock center and an electro-fluid pressure converting means responsive to the output from the control circuit to vary the fluid pressure applied to the tail stock center in accordance with the variation in the cutting resistance whereby to apply holding pressure commensurate with the cutting resistance to the workpiece by the tail stock center.

BACKGROUND OF THE INVENTION

This invention relates to a workpiece supporting device of a machine tool wherein the holding pressure applied by a tail stock center to a workpiece rotatably supported between a head stock center and a tail stock center is automatically varied to a correct value in accordance with the cutting resistance.

In prior art machine tools, the holding pressure applied by the tail stock center to the workpiece is provided by spring means and the like. However, since it was impossible to automatically vary the holding pressure in accordance with the variation in the cutting resistance the spring is adjusted to apply a predetermined holding pressure. In this manner, as the holding pressure applied by the tail stock center is maintained at a fixed value preset by the adjustment of the spring, where the cutting ability of a cutting tool such as a grinding wheel deteriorates due to heavy working, the cutting or grinding resistance between the workpiece and the grinding wheel increases with the result that the spring is compressed to retract the tail stock center from the workpiece. This loosens the fit between a center bore of the workpiece and the tip of the tail stock center thus decreasing the cutting or grinding accuracy of the workpiece. In an extreme case the workpiece disengages from the tail stock center. Such a problem can be prevented by increasing the spring pressure but excessive holding pressure often causes seizure between the center bore of the workpiece and the tail stock center or flexure of the workpiece thus degrading the working accuracy thereof.

SUMMARY OF THE INVENTION

The object of this invention is to provide a novel workpiece supporting device for use in a machine tool capable of eliminating above described difficulties.

Another object of this invention is to provide a novel workpiece supporting device capable of supporting the same at a holding pressure in accordance with the variation in the cutting resistance.

Briefly stated according to this invention there is provided a supporting device for a workpiece rotatably supported between a head stock center and a tail stock center comprising means to electrically detect variation in the torque exerted on the workpiece due to cutting resistance, a control circuit to convert an electrical quantity detected by the detecting means into an electric output, means to apply fluid pressure to one of the centers to support the workpiece, and an electro-fluid pressure converting means responsive to the electric output from the control circuit to vary the fluid pressure applied to the tail stock center in accordance with the variation in the cutting resistance whereby to apply the holding pressure commensurate with the cutting resistance to the workpiece by the one center.

BRIEF DESCRIPTION OF THE DRAWINGS

In the accompanying drawings:

FIG. 1 shows a plan view, partly in section of a grinding machine including an automatic pressure varying device for a tail stock center embodying this invention;

FIG. 2 shows a connection diagram of a bridge circuit of a strain detector employed in this invention;

FIG. 3 is a block diagram of a control circuit, and

FIG. 4 is a graph to show the relationship between voltages set by a comparator circuit and solenoid energizing voltages.

DESCRIPTION OF THE PREFERRED EMBODIMENTS

FIG. 1 of the accompanying drawing illustrates one embodiment of this invention as applied to a grinding machine comprising a horizontal table 1, a head stock 2 and a tail stock 3 secured on the table by means of a suitable clamping means, not shown. The head stock 2 includes a main shaft 4 non-rotatably secured to head stock 2 by means of a key not shown and a center 5 fitted on one end of main shaft 4. A driving plate 6 is secured by bolts 10 to the outer surface of a rotary ring 9 rotatably mounted on main shaft 4 through bearings 7 and 8. Rotary ring 9 is driven by an electric motor not shown, through V belts 11, an intermediate shaft 12 rotatably mounted on head stock 2 and a pulley 13 secured to intermediate shaft 12. A driving member 14 is threaded into the front surface of driving plate 6. As shown, a workpiece 16 is rotatably mounted between center 5 of head stock 2 and a center 15 of tail stock 3 and is rotated with the rotary ring 9 when a carrier 17 clamped on one end of workpiece 16 engages driving member 14. To grind the workpiece there is provided a grinding wheel 18 mounted on one end of a grinding wheel spindle supported by a grinding wheel head not shown.

A strain gauge 19 is mounted on driving member 14 secured to driving plate 6 and lead wires 19a to strain gauge 19 are connected to ship rings 21 which are embedded in an insulator 20 secured to rotary ring 9. Brushes 22 cooperating with slip rings 21 are connected to an external circuit through lead wires 23a and 23b which are connected with resistors r1 and r3 constituting a bridge circuit together with a resister r2 and a potentiometer P as shown in FIG. 2. The bridge circuit is energized from a source of power E.

The tail stock 3 comprises a holding shaft 24 coaxial with the workpiece 16 and slidably received in an axial bore in the main body of the tail stock. Holding shaft 24 is prevented from rotating by fitting a key member 25 threaded in the main body in a key way 24a formed on shaft 24. Above described center 15 adapted to support one end of the workpiece 16 is fitted in the outer end of holding shaft 24. A push shaft 27 supporting a feed shaft 26 therein is slidably received in the bore at the right hand end of the tail stock 3 to oppose the inner end of holding shaft 24 and in coaxial relation therewith. Feed shaft 26 threadedly engages holding shaft 24 its threaded inner end at 26b and the right hand end of push shaft 27 is clamped between a flange 26b at the center of holding shaft 26 and a hand wheel 29 secured to the outer end of holding shaft 26 by a nut 28 engaging a threaded end portion 26c. A radial opening 27a is provided for push shaft 27 to receive one end of a swinging arm 31 pivotally mounted on the main body of tail stock 3 at 30. The opposite end of swinging arm 31 is received in a recess 33a of a piston 33 that is slidably received in a cylinder bore 32 formed in the main body of tail stock 3 in parallel with the axis of push rod 27. Thus, as the piston 33 moves push shaft 27 is reciprocated through swinging arm 31 so as to reciprocate holding shaft 24 and center 15 held thereby. A spring 36 is interposed between the left hand end of piston 33 and a plug 35 secured to cylinder 32 by bolts 34 to close the cylinder bore to urge piston 33 to the right as viewed in FIG. 1 thus urging push shaft 27, feed shaft 26, holding shaft 24 and center 15 as a unit against workpiece 16 through swinging arm 31. To limit the leftward movement of piston 33 there is provided a stop 36a adjustably and threadedly engaged with plug 35.

Turning now to the electro-fluid pressure converting device, the main body of the tail stock 3 is formed with a spool chamber 37 in parallel with cylinder 32 to slidably receive a spool valve 38. Two annular spaced grooves 37a and 37b are provided near the center of spool chamber 37, the left hand groove 37a being communicated with the left hand chamber 32L of cylinder 32 via an oil conduit 39 while the right hand groove 37b with a source of oil pressure not shown through ports A and P of a switching valve 40. Right hand chamber 32R of cylinder 32 is communicated with a tank of the source of oil pressure via an oil conduit 41 and ports B and T of the switching valve 40. In this manner when switching valve 40 is switched, piston 33 is moved toward left against the force of spring 36 to bodily retract push shaft 27, holding shaft 24 and center 15 to the right. In the illustrated example, spool valve 38 has three spaced apart lands with the middle land 38m confronting annular groove 37a. Annular groove 37b supplied with pressurized oil from the source through switching valve 40 is positioned between the middle land 38m and right hand land 38r. A notch 38l' is provided in the periphery of the left hand land 38l to admit pressurized oil into the left hand chamber 37L of spool chamber 37 from annular groove 37B through the space between central land 38m and annular groove 37a and the notch 38l' of left hand land 38l. The pressurized oil admitted in the left hand chamber 37L is then supplied to the right hand chamber 37R of spool chamber 37 through an axial passage 38' extending through the center of spool valve 38. A throttle valve chamber 43 is also provided communicated with the right hand chamber 37R through an orifice 42 and containing therein a conical valve member 44 for adjusting the degree of opening of orifice 42 thus returning the pressurized oil admitted into the throttle valve chamber 43 in accordance with the degree of opening of the conical valve member 44 to the tank of the source through discharge port 45. The conical valve member 44 is urged against orifice 42 by means of a spring 46 acting on the rear surface of valve member 44. The force of spring 46 is regulated by movement of a shaft 49 electromagnetically operated by a solenoid 48 secured to the main body of tail stock 3. Lead wires 48a of solenoid 48 are connected to output terminals 23c of the above described bridge circuit through a control circuit shown in FIG. 3.

The control circuit comprises an amplifier 50 to amplify the output voltage from the strain detector shown as the bridge circuit. The output voltage from amplifier 50 is supplied to a comparator circuit 51 having a number of reference voltages of different amplitudes. When the output from the amplifier exceeds one of the preset reference voltages a selector circuit 53 operates to energize solenoid 48 through a transformer 52 and a rectifier 54 in accordance with said one reference voltage. As shown, the strain detector, amplifier 50, comparator circuit 51, selector circuit 53 and transformer 54 are energized by a source of supply.

The embodiment described above operates as follows:

In the condition shown in FIG. 1 workpiece 16 is supported by centers 5 and 15, the latter being urged against the workpiece by a predetermined pressure. As the workpiece 16 is rotated, the grinding head, not shown, is advanced. When the grinding wheel 18 is brought to engage the workpiece and as the cutting resistance opposing the torque exerted on the workpiece 16 increases, the accuracy of the working of the workpiece is lowered or the workpiece falls in extreme cases, as above described unless the center 15 of the tail stock 3 supports the workpiece under a holding pressure commensurate with the cutting resistance. As the resistance to rotation of the workpiece is increased in this manner, the resultant torque aplied to driving member 14, which drives the workpiece, is increased to increase the electric resistance of strain gauge 19. Thus the output voltage from the output terminals 23c of the bridge circuit connected to the strain gauge increases to energize solenoid 48 through said control circuit, whereby shaft 49 is moved to the left as viewed in FIG. 1. This leftward movement of shaft 47 assists the force of spring 46 to decrease the opening of orifice 42 by conical valve member 44. The pressurized oil supplied to annular groove 39b through port P of switching valve 40 which is now assumed to be in the position shown in the drawing enters into the space between central land 38m and the right hand land 38r of the spool valve 38 and thence supplied to the left hand chamber 32L of cylinder 32 via oil passage 39. As a result, piston 33 is biased toward the right by the force of spring 36 and oil pressure so as to push center 15 to the left against the reaction acting upon it thus firmly supporting workpiece 16. The pressure applied to center 15 in this manner is determined by the quantity of the pressurized oil admitted into the left hand chamber 37L of the valve chamber 37 through notch 38l' of left land of spool valve 38 and annular groove 37a. The pressurized oil is also supplied to the left hand chamber 37L of the valve chamber 37 through notch 38l' of left hand land 38l of spool valve 38, and then to the right hand chamber 37R of valve chamber 37 through passage 38' extending through the center of spool valve 38. When orifice 42 is completely closed by conical valve member 44 the oil pressure in the right hand chamber in spool valve chamber 37 will rise to move spool valve 38 to the left whereby to increase the quantity of the pressurized oil supplied to the left hand chamber 32L of cylinder 32 to increase the holding pressure opposing the reaction applied to center 15. On the contrary when the cutting resistance of the workpiece 15 decreases, the electric resistance of strain gauge 19 decreases to decrease the output voltage at output terminals 23c of the bridge circuit. As a result, the pull of solenoid 48 is also decreased so that the rod 49 is moved toward the right until the oil pressure in orifice 42 forcing the conical valve member 44 to the right comes to balance with the sum of the force of spring 46 and the magnetic pull of solenoid 48 acting upon rod 49. Thus conical valve head 44 is moved slightly to the right to increase the opening of orifice 42 so that the pressure in the right hand chamber 37R of valve chamber 37 decreases to move spool valve 38 to the right with the result that the quantity of the pressurized oil supplied to the left hand chamber 32L of cylinder 32 is decreased whereby the holding pressure applied to center 15 by piston 33 is reduced.

The holding pressure applied to center 15 is varied in accordance with the change in the cutting resistance by converting the change in the electric resistance of strain gauge 19 into the change in the output voltage across output terminals 23c of the bridge circuit so as to stepwise vary the solenoid energizing voltage as shown in FIG. 4 which is supplied through transformer 52 and rectifier 54 by the action of the control circuit. More particularly, as the holding pressure applied to center 15 is increased, the torque applied to strain gauge 19 through driving member is also increased. The sum of this increased torque and the increased cutting resistance increases the voltage supplied to comparator circuit 51 from the output terminals 23c of the bridge circuit through amplifier 50. When this output voltage supplied to comparator circuit 51 tends to increase from a valve between reference voltages e2 and e3 to a valve between reference voltages e3 and e4, for example, then at the time when the output voltage becomes equal to voltage e3 selector circuit 53 operates to select a solenoid energizing voltage E3 corresponding to reference voltage e3. On the contrary, when the cutting resistance decreases so as to tend to decrease the output voltage supplied to comparator circuit 51 from the bridge circuit to a valve between reference voltages e2 and e3 from a value between reference voltages e3 and e4, then at the time when the output voltage becomes equal to the reference voltage e2 selector circuit 53 operates to select a solenoid energizing voltage E2 corresponding to the reference voltage e2. In this manner, the voltage applied to solenoid 48 is stepwise varied in accordance with the variation in the cutting resistance.

This invention provides a novel workpiece supporting device wherein the variation in the cutting resistance acting upon a workpiece is electrically detected by means of a strain gauge secured to a driving member adapted to rotate the workpiece, and the detected variation is utilized to vary the quantity of the pressurized oil supplied to an oil pressure cylinder to vary the holding pressure applied to the center of a tail stock through the action of an electro-fluid pressure converting apparatus comprising a solenoid operated spool valve means to automatically vary the holding pressure applied to the center in accordance with the variation in the cutting resistance. Thus an adequate pressure is always applied to the workpiece between the head stock center and the tail stock center in accordance with the variation in the cutting resistance so that it is possible to eliminate such difficulties as the flexure or falling off of the workpiece to improve the accuracy of the working.

While the invention has been shown and described in terms of a preferred embodiment thereof it will be clear that many changes and modifications will occur to one skilled in the art without departing from the true spirit and scope of the invention as defined in the appended claims.

I claim:

1. In a machine tool wherein a workpiece is rotatably supported by a head stock center and a tail stock center, a workpiece supporting device comprising means to electrically detect the variation in the torque of said workpiece due to working resistance, a control circuit to convert an electrical quantity detected by said detecting means into an electrical output, means to apply fluid pressure to one of said center to support said workpiece, and an electro-fluid pressure converting means responsive to said electric output from said control circuit to vary said fluid pressure applied to the one of said centers in accordance with the variation in the working resistance of said workpiece whereby to apply the holding pressure commensurate with the working resistance to said workpiece by said one center.

2. The workpiece supporting device according to claim 1 wherein said one center is the tail stock center of said machine tool.

3. The workpiece supporting device according to claim 1 wherein said working resistance detecting means comprise a strain gauge mounted on a member for applying torque to said workpiece to produce variations in the circuit resistance of said strain gauge in response to the variation in said torque.

4. The workpiece supporting device according to claim 2 wherein said means to apply pressure to said workpiece comprises a cylinder in said tail stock and a piston received in said cylinder for moving said tail stock center in a direction to support said workpiece.

5. The workpiece supporting device according to claim 4 wherein said piston is provided with a spring acting to urge said tail stock center against said workpiece.

6. The workpiece supporting device according to claim 4 wherein means for moving said tail stock center over a small distance is provided for said means for moving said tail stock center.

7. The workpiece supporting device according to claim 4 wherein said electro-fluid pressure converting means comprises a spool valve means to supply fluid pressure to said cylinder to force said piston in a direction to urge said tail stock center against said workpiece, a throttle valve including an orifice and a valve member to regulate the quantity of the pressurized fluid supplied to said spool valve means, and an electromagnetic means responsive to the output from said control circuit to control the opening of said orifice of said throttle valve.

8. The workpiece supporting device according to claim 7 wherein said control circuit comprises an amplifier to amplify the electric quantity detected by said working resistance detecting means and a comparator circuit to compare said amplifier electric quantity with one of a plurality of reference electric quantities to apply an output voltage to said electromagnetic means.

References Cited

UNITED STATES PATENTS

| | | | |
|---|---|---|---|
| 1,939,147 | 12/1933 | Snyder | 82—40 |
| 3,026,724 | 3/1962 | Gstalder | 82—404 X |
| 3,198,226 | 8/1965 | Haumann | 144—209 |
| 2,955,391 | 10/1960 | Fred | 51—237 X |

HAROLD D. WHITEHEAD, Primary Examiner

U.S. Cl. X.R.

82—28, 40; 144—209